United States Patent [19]

Wenzel

[11] 4,325,013
[45] Apr. 13, 1982

[54] ELECTRICAL TRACER CONTROL SYSTEM UTILIZING SINE WAVE RESOLUTION

[76] Inventor: Robert H. Wenzel, 3426 E. Ruth Pl., Orange, Calif. 92667

[21] Appl. No.: 134,766

[22] Filed: Mar. 28, 1980

[51] Int. Cl.³ .............................................. G05B 19/33
[52] U.S. Cl. ..................................... 318/578; 318/622; 318/592; 318/595; 318/654; 318/656; 318/571
[58] Field of Search ............... 318/571, 578, 621, 622, 318/592, 595, 654, 655, 656, 657, 658, 659, 660, 661

[56] References Cited

U.S. PATENT DOCUMENTS 3,582,749  6/1971  Wenzel ................................ 318/578

*Primary Examiner*—J. V. Truhe
*Assistant Examiner*—Eugene S. Indyk
*Attorney, Agent, or Firm*—Donald D. Mon

[57] ABSTRACT

A control for a profiling machining tool, and a method for controlling such a tool. The machine tool includes a sensing head which moves along a template or pattern to produce a signal that causes motors relatively to shift a cutting tool and a workpiece so as to duplicate in the workpiece the profile of the template or pattern. Two sinusoidal signals are generated as a consequence of stylus deflection along orthogonal axes. They are combined to form a single sinusoidal signal which is then variously processed to produce an error signal which causes the motors to operate in directions which tend to reduce the error signal, and to cause the stylus automatically to move along the profile while doing so.

18 Claims, 3 Drawing Figures

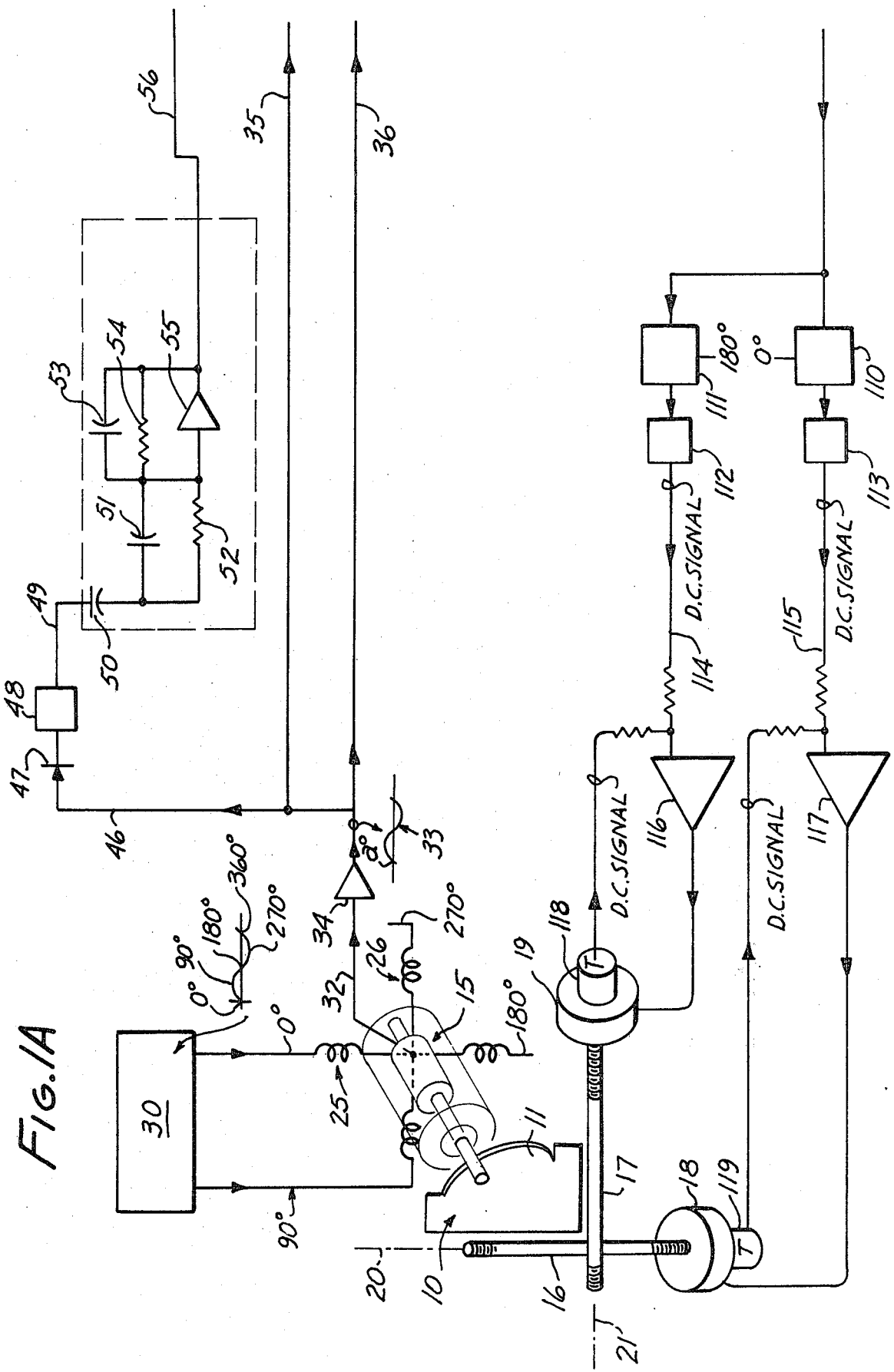

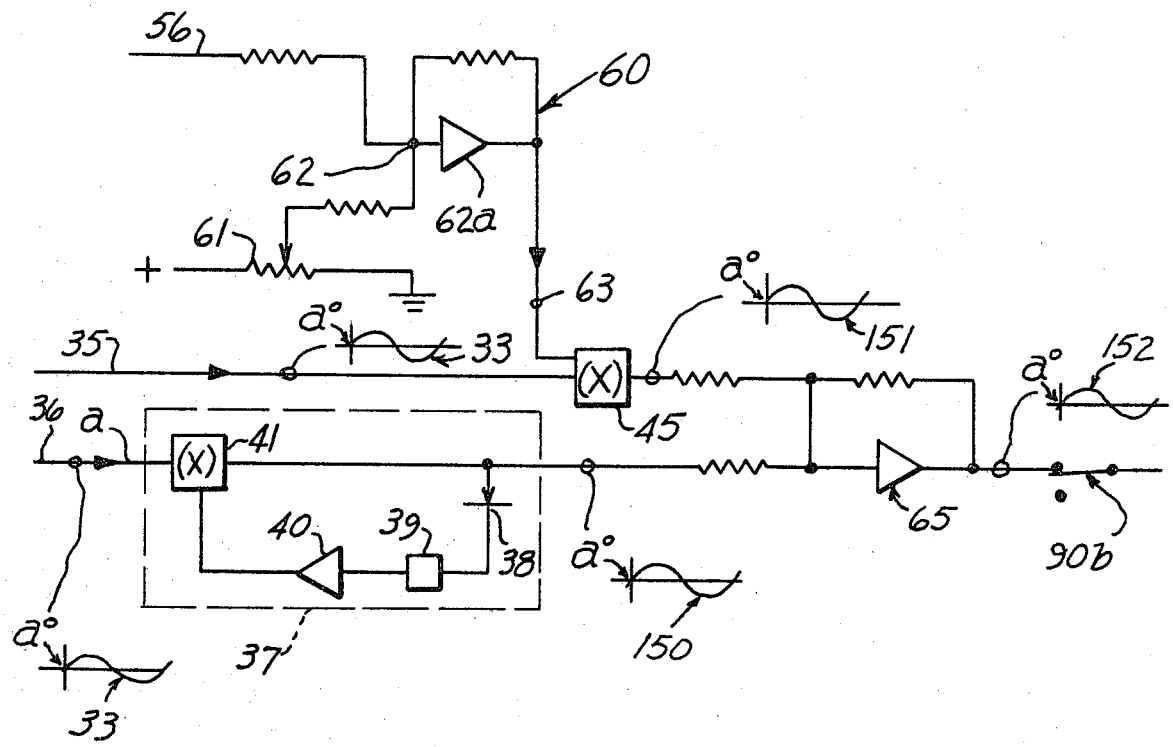

ELECTRICAL TRACER CONTROL SYSTEM UTILIZING SINE WAVE RESOLUTION

FIELD OF THE INVENTION

This invention relates to profiling machine tools such as tracer-controlled lathes and milling machines, and to a method for controlling such machines.

BACKGROUND OF THE INVENTION

Profiling machine tools are well known. Classically they have a sensing head (sometimes called a "tracer") with a stylus which is caused to trace over the contour of a pattern or template and give rise to signals which are processed and utilized to control motors that relatively shaft a cutting tool and workpiece so as to duplicate in the workpiece the contour of the template or pattern. The art includes hydraulic-type tracers and also electrical tracers. This invention relates to the latter type.

In electrical control systems, it is conventional for a sensing head to include two transducers which are orthogonally related to one another, and to excite them in such a way that stylus deflection will cause them to produce a signal which is proportional to the component of stylus deflection along their respective axis. The resulting signals are then, in various ways, utilized to provide a control signal for motors which drive machine tool components for the purpose of causing a cutting tool to move relative to a workpiece and thereby duplicate the contour of the template or stylus in the workpiece.

One prior art system of this type is shown in Robert H. Wenzel U.S. Pat. No. 3,582,749, issued June 1, 1971. This entire patent is incorporated herein by reference, especially for its showing of sensing heads, tracer-controlled machine tools, general construction, details and elements of circuit construction, and the theory of and operation of such tools. This invention is an improvement over the system shown in the said Wenzel patent in that its construction is simpler, and its signals enable more accurate contour duplication under many operating conditions.

BRIEF DESCRIPTION OF THE INVENTION

A control system according to this invention is utilized on a profiling machine tool of the type which has means for mounting a cutting tool and a workpiece, and motors adapted to cause relative motion between them along at least two orthogonally related axes. The tool also includes a sensing head (sometimes called a tracing device or tracer) which is intended to trace along the contour of a template or pattern to generate signals which will ultimately cause relative movement to occur between the cutting tool and the workpiece, whereby to duplicate in the workpiece the contour of the template or pattern.

According to a feature of this invention, the sensing head is excited by sinusoidal signals so as to produce orthogonally related sinusoidal signals representative of components of stylus deflection along two respective axes. These signals are combined to form a single sinusoidal signal which is variously processed so as to produce a signal which will cause the motors to operate and cause relative motion to occur between the cutting tool and the workpiece, and also between the sensing head and the template or pattern.

BRIEF DESCRIPTION OF THE DRAWING

This invention will be fully understood from the following detailed description and the accompanying drawing in which:

FIGS. 1A and 1B are circuit drawings showing the present preferred embodiment of the invention; and FIG. 2 is a circuit drawing showing an alternate portion for the circuitry of FIG. 1.

DETAILED DESCRIPTION OF THE DRAWING

Figure 1B:
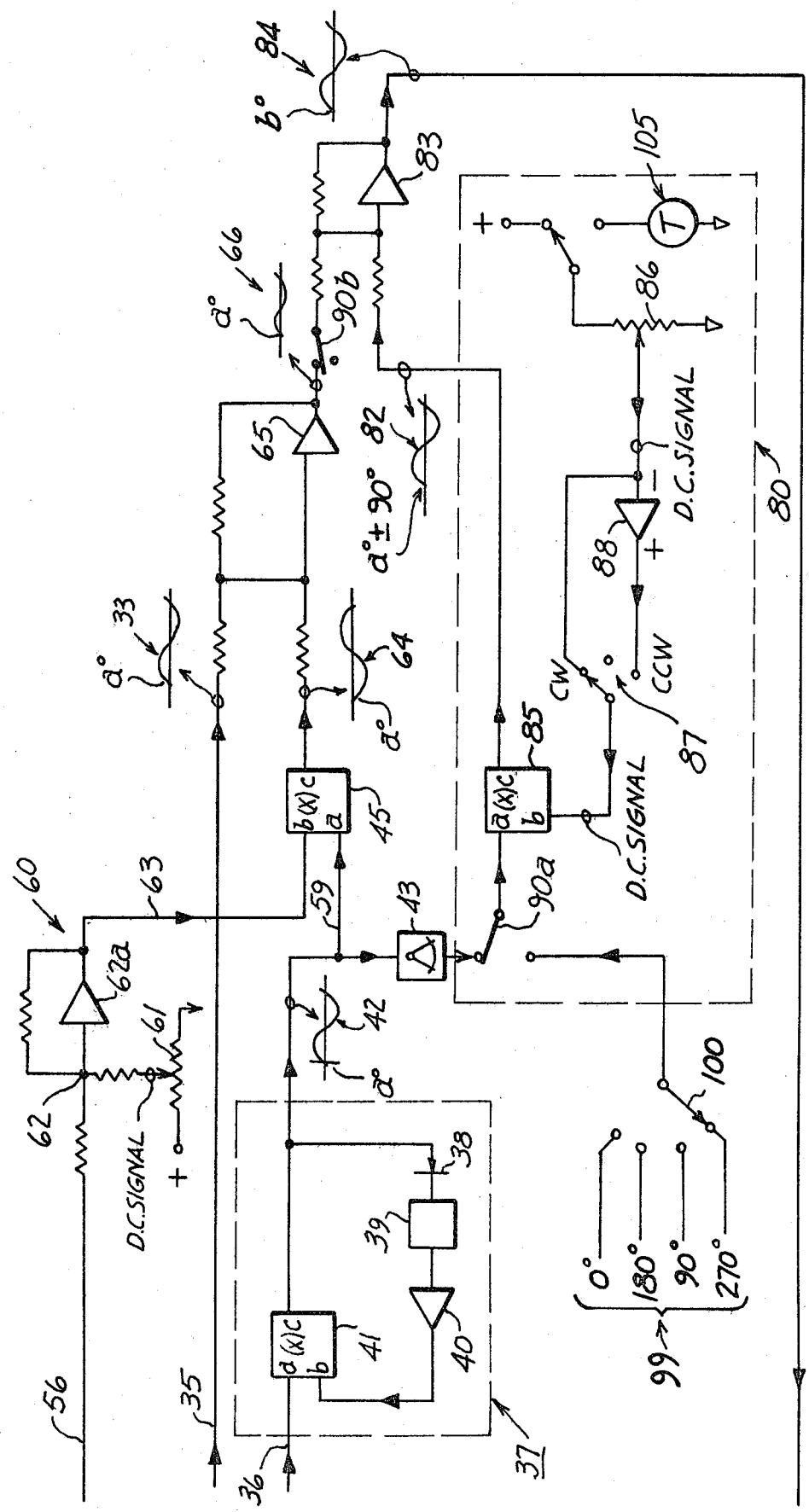

The reader will wish to have at hand a copy of said Wenzel U.S. Pat. No. 3,582,749 whenever specific details of construction are of importance to him.

There is schematically shown in this specification a template 10 (which could be a three-dimensional pattern if preferred). The template has an edge 11 with a contour to be duplicated in a workpiece (not shown) that might be mounted to the chuck of a lathe or to the table of a milling machine. The milling machine will also mount a sensing head 15 and a cutting tool (not shown). Relative motion is caused by a first axis motive means 16 and a second axis motive means 17 which are powered by a first axis servo motor 18 and by a second axis servo motor 19, respectively, all as well known in the art. To briefly summarize the matter, actuating the motive means will shift the table of a mill or some part of a lathe to cause relative motion along first axis 20 or second axis 21, respectively. The most convenient motive means is a lead screw, as illustrated. However, electro-hydraulic actuators, such as electrically controlled piston-cylinder hydraulic motors, can conveniently be used instead. The type of motive means disclosed is not a limitation on the invention. Throughout the remainder of this specification lead screws and electric motors will be discussed as a specific, preferred, embodiment.

The sensing head, which is fully disclosed in said Wenzel patent, includes within it a first axis stylus position transducer 25 and a second axis stylus position transducer 26. As schematically shown in the drawings, these are provided as two electromagnetic tracer sections orthogonally related so that they produce signals which are in quadrature to one another. The sensing head is excited by source 30 of alternating excitation voltage, for example 2KC sinusoidal. The first axis transducer is responsive to the 0° and 180° excitations, and second axis transducer 26 is responsive to the 90° and 270° excitations from the source.

The function of the transducers is for each to produce a sinusoidal deflection signal whose amplitude is proportional to the component of deflection of the stylus from a null position along its respective axis. Means 32, namely a conductor, combines these two signals into a single sinusoidal position transducer output signal 33 ("single signal 33").

Signal 33, and all other signals which are related to it, are schematically shown relative to an angle "a". This is the phase angle representative of the angle of direction of deflection of the stylus from a reference direction. The excitation voltage is the basic time reference, and when shown relates to zero degrees in its own wave form, that is, its time phase of zero crossing is at zero degrees along the abscissa of the curve. However, all the downstream wave forms that are derived directly from the sensing head output (i.e. from the single signal 33) are shown with their time phase of zero crossing at time a°, which is in time phase with that of signal 33. It should be kept in mind that the same signal might be inverted, so that its slope at zero crossing may be positive or negative, while the slope of signal 33 at zero crossing is negative or positive, instead of being the same. Still the phase relationship will remain the same.

Signal 33 is a sinusoidal signal whose phase is shifted by an angle "a°" proportionally to the angularity of the deflection. Its amplitude is proportional to the amount of stylus deflection along the vector of stylus deflection from the center null position. This signal is amplified by amplifier 34, and is then provided to three segments of the circuitry.

A first conductor 35 conducts this signal to circuitry yet to be described. A second conductor 36 conducts the signal to a precision ac voltage regulator 37 which is shown schematically as constituted by a rectifier 38, filter 39, amplifier 40, and multiplier 41. The resulting signal 42 (sometimes called a "regulated signal") is sinusoidal and has a constant voltage. Its time phase of zero crossing, a, is in time phase with the same zero crossing of signal 33. Signal 42 is applied to a 90° phase shifter 43 for purposes yet to be described. Signal 42 is also applied to a multiplier 45 which produces another signal yet to be described.

Single signal 33 is also applied to a circuit which commences at conductor 46. This circuit includes rectifier 47 and filter 48, the filter being shown schematically. This circuit is for the purpose of achieving greater stylus position control system gain (amplification) by providing suitable compensatory signals to diminish the effect of combined machine tool structural and control system resonances which limit maximization of the control system gain. The attainment of higher stylus position control gain results in proportionally increased tracing accuracies (smaller tracing error). Filter 48 is a low frequency pass filter, passing frequencies between about one and 20 cycles per second. Obviously it filters out the 2KC signal. It acts as an integrator, and depending on the input it receives, its output to conductor 49 is dc, or dc with a low frequency ac signal imposed on it.

Capacitor 50 blocks the dc component of the signal from conductor 49, to pass only a low frequency ac signal, which occurs only when there is a perturbation. An assmebly comprising capacitor 51 and resistor 52 provide for lead compensation, and an assembly comprising capacitor 53 and resistor 54 provide for lag compensation. Amplifier 55 applies the compensated signal to conductor 56. The circuitry between conductors 46 and 56 is sometimes referred to as a "machine position control compensation network", for the reason that it provides a signal compensatory to perturbations arising from machine tool and control system dynamic characteristics. This circuitry is optional, and is not necessary to the functioning of the total system, but it can enable closer-tolerance production.

Deflection control circuit 60 includes an adjustable-voltage dc source 61 that provides a dc signal for the purpose of determining the amount of deflection of the stylus from null which must occur before control begins, i.e., at which an error signal will be generated that ultimately causes the motors to operate. In machine tool parlance, this initial deflection is sometimes called "stylus offset". The low frequency signal passed by the machine position control compensation network will be on the order of perhaps 1 to 20 cps, and when provided will be combined with the dc signal from source 61 at point 62, and passed through a buffer amplifier 62a and conductor 63 to multiplier 45. Again, the low frequency signal and its circuitry are optional. This branch of the circuit could instead originate with source 61.

In the illustrated circuitry, the output of multiplier 45 is the product of the signals on conductor 59 from the voltage regulator and on conductor 63 from source 61 alone or (if provided) combined with the signal from the machine position control compensation network. The output signal from multiplier 45 is inverted from signal 42, but is in time phase with the same zero crossing of signal 33.

Here it will be observed that throughout the circuitry, inversion of signals or components of signals could be effected, which will not affect the control parameters. This is because the time phase of zero crossing is not affected. When inverted as shown, deflection reference signal 64 is 180° out of phase with signal 33, but it would be just as useful if not inverted, and in phase, if appropriate other inversions were made elsewhere in the circuitry as will later be discussed in more detail.

The amplitude of error signal 66 in FIG. 1 is caused by a multiple usage of single signal 33 as follows:

(a) by the use of regulator 37, producing a signal 42 identical to signal 33, but with a known and constant voltage;

(b) multiplying signal 42 by a dc signal from source 61 (which may or may not have a low frequency ac component, depending on whether elements 47 and 48 are used, and perturbations exist) to produce deflection reference signal 64, which is inverted relative to signal 33. This is combined with signal 33 to produce the error signal. In other words, signal 33 has been processed and inverted; and (c) signal 33 is in effect subtracted from the processed and inverted signal to produce the error signal.

The same functional control can be established using the same circuit components, but with a somewhat different logic, and it, and other conceivable modifications, will be within the scope of this invention.

For example, the logic of a useful circuit shown in FIG. 2 is as follows:

(a) by the use of regulator 37, producing a signal 150 identical to signal 33, but with a known and constant voltage;

(b) in multiplier 45 multiplying single signal 33 by the signal from dc source 61 (and from elements 47 and 48 if used), to produce signal 151 identical to signal 33 except for amplitude, one or the other of these signals having been inverted, such as by voltage regulator 37; and then (c) these signals are combined at amplifier 65 to produce an error signal 152 which is analogous to error signal 66, although its amplitude may be different. Still it is useful as an error signal.

Attention is called to the fact that in both systems, signal 33 is treated to produce a regulated voltage signal, which is either used directly, or treated further and then used, in combination with a signal from a dc source, the single signal, either as such or treated further such as in FIG. 2, being combined with another signal so as to provide a sinusoidal error signal with an in-phase time of zero crossing with signal 33.

Thereafter, when provided, additional control signals will be added to the error signal.

In FIG. 2, like circuit elements are shown with identical numbers even though their interconnections are different. The circuitry of FIG. 2 may be directly substituted in FIG. 1 at conductor 35, 36 and 46, and at switch segment 90b.

As stated above, in FIG. 1 the multiplier produces relative to regulated signal 42, an inverted signal 64 the signal on conductor 63. It is in phase therewith, but whose amplitude is also a function of a sinusoidal ac "deflection reference signal 64" that is 180° out of phase with single signal 33. Signal 64 and signal 33 (from conductor 35) are next combined at signal error amplifier 65, and this produces a sinusoidal error signal 66 which is useful for control of the motors. A switch 90 has two ganged segments, one of which, segment 90b, is an off-on switch receptive of signal 66, which can pass or bar the signal.

Signal 66 is an error signal which has the information needed to cause the machine to move in the vectorial direction to restore the stylus to the correct operating deflection. However, for automatic and some other controlled modes of operation, further or other command is needed to cause the stylus to traverse the profile of the template or pattern. This traversing motion should be at right angles to the operating deflection. This is to say, the stylus will be deflected normally to the profile at the point of contact, and the feed direction should be parallel (tangent) to the profile at that point. Therefore a feed command signal must be provided which is in quadrature to the regulated head output signal 42.

This is readily accomplished by feed command circuit 80. Phase shifter 43 also receives signal 42, and shifts it 90°. That is to say, its time phase of zero crossing is 90° displaced from that of signal 42 (and of single signal 33). Thus there is provided a precisely regulated sinusoidal ac signal 90° displaced from signal 42. This signal is applied to segment 90a of switch 90 which selectively can apply it to a multiplier 85 when automatic operation is desired, at which time segment 90b of the ganged switch will be closed. Optionally, should automatic approach be desired, segment 90b will be open, and segment 90a will be connected to a switch 100 as will later be described.

Feed command circuit 80 includes said multiplier 85 which receives the 90° shifted signal, and also a dc signal from an adjustable voltage dc source 86. By means of switch 87 and an inverting amplifier 88, the polarity of the dc signal can be selected, and then applied to multiplier 85. The selected polarity will determine the direction of feed, such as clockwise or counterclockwise, by providing a 90° or 270° time phase shifted regulated head output signal 82.

When switch segment 90a connects the phase shifter to multiplier 85, the output signal from the mulitplier is a product of the dc signal from source 86, and of the 90° shifted signal from shifter 43. Source 86 is functional as an automatic feed rate control. The greater the value of the dc signal, the greater will be the command signal, and the higher will be the feed rate tangentially along the template or pattern. Signal 82 is an auto feed command signal that is 90° out of phase with error signal 66. This is as it should be, and provides a quadrature command for tangential feed. Signals 66 and 82 are combined at mixing amplifier 83, and this results in a composite sinusoidal signal 84.

Automatic approach control 99 is provided by switch 90 and selector 100, which selects signals from the excitation source to be supplied for treatment by multiplier 85, instead of the 90° shifted signal from phase shifter 43. This will cause approach motions to occur rather than tangential motions.

Should adjustment of feed rate be desired as a function of machine speed, for example to obtain a constant chip thickness, a dc tachometer output 105 from a spindle drive shaft can be provided instead of the dc signal by changing the setting of switch 101.

The foregoing circuitry and equipment have as their function to produce signal 84. When under automatic control (switch segment 90b closed), signal 84 contains an error signal when the stylus is sufficiently deflected, and usually will also contain a feed command. Here it will be observed that this invention comprehends the use of error signal 66 alone to control the motors without a feed command signal. Signal 66 is useful by itself and in combinations other than those shown herein.

In the disclosed system, error signal 66 and feed command signal 82 are combined in the one ac composite sinusoidal signal 84, and this signal will be analyzed and used to drive the motors to turn the lead screws. If the feed command signal were not provided, the error signal alone would be analyzed and used for control, because it would then constitute the "composite signal", this term being used for convenience in disclosure.

Phase detectors 110, 111 are provided, whose switching devices close at the appropriate time reference phase, and pass the signal to respective wave filters 112, 113, whereby each produces an integrated dc signal respective to movements to be made along its own axis, with an amplitude defining the desired velocity of the motor. Filters 112 and 113 behave as integrators for the current passed by the phase detectors during their conduction period.

It is instructive to notice here that the time of zero crossing of signal 84 will not necessarily be "a°" when a feed command is contained in the "composite" signal. This is because the composite signal 84 then includes not only a component in phase with signal 33, but also one which is derived from the 90° phase shifter, and the point of zero crossing (b° in FIG. 1B) is determined both by the error signal and by the feed command signal 82.

Conductor 114 carries a signal respective to lead screw 17, and conductor 115 to lead screw 16. The dc signals are applied to power amplifiers 116, 117 to drive the respective motors, 19 and 18. Tachometer generators 118, 119, driven by the motors, generate dc signals which are fed back to the amplifier to complete the motion velocity control loop.

The operation of the systems is believed to be evident from the foregoing description. Briefly summarized, the machine is caused to move, either manually (by manually turning drivewheels on the tool) or automatically, until the pre-selected amount of stylus deflection occurs. then the feed control starts in quadrature relative to the stylus deflection, and deviations from the pre-selected deflection cause an error signal to be generated which will keep the stylus against the profile while it travels along it. The feed command is derived from the quadrature signal derived from shifter 43, and this component of the signal causes the tangential feed movement to occur.

The signal processing is elegantly simple and precise. It utilizes multiplying techniques to be used which are very accurate, and it uses entirely sinusoidal feed and error signals, which yield accurate component resolution in contrast to the use of chopped dc signals, which is the technique used in the said Wenzel patent. Deflection and feed controls of the system are entirely conventional dc circuitry, and do not require the use of special forms of control cables. Knowledge of the specific values of the various circuit components are unnecessary, and will vary depending on the installation. Persons skilled in the electronics art will have no difficulty in selecting conventional components and sub-circuits to accomplish the objectives of the invention. Reference may be had to the said Wenzel patent for disclosure of details of construction of the sensor head and other specialized components.

This invention is not to be limited to the embodiments shown in the drawings and described in the description, which are given by way of example and not of limitation, but only in accordance with the scope of the appended claims.

I claim:

1. A control for a profiling machine tool of the type which includes means mounting a cutting tool, and is adapted to cause relative motion between said cutting tool and a workpiece along at least two orthogonally-related axes so the said cutting tool can traverse a path relative to the workpiece which is geometrically similar to the contour of a template or pattern, motor means respective to each of said axes for causing relative motion along each respective axis, a sensing head of the type having a deflectible stylus and, coupled to said stylus, a pair of stylus position transducers each respective to one of said axes and adapted to produce a signal with a magnitude indicative of stylus defection in the respective axis, said control comprising:

a source of excitation voltage to excite each of said transducers with a sinusoidal voltage to produce a signal from both of said transducers, the excitation voltages applied to said transducers being 90° out of phase with one another;

means combining said signals from said transducers to provide a single sinusoidal transducer output signal;

voltage regulator means receiving said single signal and producing a regulated signal whose time of zero voltage crossing is in time phase with the same zero crossing of said single signal and having a constant and pre-determined sinusoidal voltage;

adjustable stylus deflection control means providing a direct current command signal proportional to a desired stylus deflection;

multiplier means multiplying one of said regulated signal and said single signal by said direct current command signal to produce a multiplied signal;

inverting means inverting one of said single signal, regulated signal or multiplied signal;

means receiving and combining said multiplied signal, and whichever of said regulated signal and single signal that was not multiplied by said direct current command to produce a sinusoidal error signal; and resolution means receiving said error signal and producing motor control signals respective to stylus error on respective axes, which enable power to be supplied to drive respective motors in such directions as to reduce the error signal as the consequence of changing the relative position of the sensing head and template or pattern by operation of said motors.

2. A control according to claim 1 in which said multiplier means multiplies said regulated signal by said command signal.

3. A control according to claim 2 in which said multiplier means is also said inverting means.

4. A control according to claim 1 in which said multiplier means multiplies said single signal by said command signal.

5. A control according to claim 4 in which said multiplier means is also said inverting means.

6. A control according to claim 1 in which said adjustable stylus deflection control comprises a source of direct current of adjustable voltage.

7. A control according to claim 6 in which a machine position control compensation network receives said single signal, and comprises a rectifier and a filter to rectify and remove from said signal ac frequencies above about 20 cps, and in which the signal from said network is added to the direct current signal from said source of direct current.

8. A control according to claim 7 in which capacitor-resistor assemblages are incorporated into said network to cause lead or lag in the output from said network.

9. A control according to claim 1 in which a 90° phase shifter receives said regulated signal and shifts its phase by 90° and in which a second source of direct current of adjustable voltage and a second multiplier are included; the shifted-phase signal from said phase shifter, and said last-mentioned direct current signal are multiplied in said second multiplier to form an automatic feed command signal 90° or 270° phase related to said regulated signal, said automatic feed command signal being combined with said error signal to produce a composite sinusoidal signal to be analyzed by said resolution means.

10. A control according to claim 9 in which switch means is interposed upstream from said resolution means having a first switching condition causing said combination of error signal and automatic feed control signal, and a second switching condition disconnecting said error signal and phase shifter, and substituting for said phase shifter selected ones of said excitation voltages to provide for approach operation.

11. A control according to claim 9 in which a source of voltage from a tachometer responsive to spindle speed is substituted for said last-mentioned source of dc voltage.

12. A control according to claim 1 in which said resolution means comprises a pair of phase detector means respectively conducting between 0° and 180° and between 90° and 270°, and filter means respective to the output of each of them to produce a respective dc signal whose amplitude is proportional to the direction and desired velocity of a respective one of said motors.

13. A control according to claim 12 in which both of said phase detectors receive said composite signal, and each applies its output to a respective filter.

14. A control according to claim 2 in which said resolution means comprises a pair of phase detector means respectively conducting between 0° and 180° and between 90° and 270°, and filter means respective to the output of each of them to produce a respective dc signal whose amplitude is proportional to the direction and desired velocity of a respective one of said motors.

15. A control according to claim 14 in which said multiplier means multiplies said regulated signal by said command signal.

16. A control according to claim 4 in which said resolution means comprises a pair of phase detector means respectively conducting between 0° and 180° and between 90° and 270°, and filter means respective to the output of each of them to produce a respective dc signal whose amplitude is proportional to the direction and desired velocity of a respective one of said motors.

17. A control according to claim 16 in which said multiplier means multiplies said regulated signal by said command signal.

18. A control according to claim 13 in which a respective tachometer generator is driven by each of said motors whose output is applied in opposition to the output of the respective filter to form a control loop.

* * * * *